United States Patent Office 3,448,171
Patented June 3, 1969

3,448,171
HIGH MOLECULAR WEIGHT URETHANE POLYMERS HAVING AN ORDERED ARRANGEMENT OF PENDANT UNSATURATION AND PROCESS FOR THEIR PRODUCTION
Adolfas Damusis, Detroit, Mich., assignor to Wyandotte Chemicals Corporation, Wyandotte, Mich., a corporation of Michigan
No Drawing. Filed Sept. 6, 1966, Ser. No. 577,169
Int. Cl. C08g 22/06, 41/04
U.S. Cl. 260—859          14 Claims

ABSTRACT OF THE DISCLOSURE

Urethane polymers may be prepared from the reaction of an isocyanate terminated polyether with an ethylenically unsaturated compound having a functional group capable of reacting with the isocyanate. The functional group is exemplified by carboxy, amino and mercapto. A chain extender is required, as exemplified by difunctional hydroxy, carboxy, amino and mercapto terminated polyethers.

Alternately, an hydroxy terminated polyether may be reacted with a monoethylenically unsaturated carboxylic acid, and a chain extender added. The chain extender is any of an isocyanate terminated polyether, polyester or polyurethane.

This invention relates to a new class of high molecular weight urethane polymers. In a more specific aspect, this invention relates to a new class of high molecular weight urethane polymers having an ordered arrangement for pendant unsaturation and to a process for preparing the same.

Heretofore, various types of polyurethane polymers have been prepared which may be cured to produce valuable elastomeric products. One of such types is a polyurethane polymer having recurring urea groups in the chain which may be cured by the use of organic diisocyanates. This elastomer, however, is deficient in regard to resistance to boiling water, thermal stability at high temperatures, and is adversely affected by moisture absorption during compounding.

Another prior art product is a polyurethane polymer containing C=C curing sites, which is cured by a sulfur-curing procedure. This material is characterized in that the C=C curing sites are found either in the backbone of the polymer or in short side chains. While this product has been found to have properties which are superior to the above polyurethane polymer cured by the use of organic diisocyanates, it still possess certain physical property limitations. Thus, the product has poor elasticity properties, thereby having a tendency to be brittle. They are also difficult to cure, since the conventional sulfur-curing systems used for natural rubber, GR–S and neoprene are not effective, the curing cycle being erratic and the times involved being much longer than is permissible for a commercial curing process.

It is, therefore, an object of this invention to provide a new class of urethane polymers and a method for their preparation. Specifically, it is an object of this invention to provide a process for preparing urethane polymers possessing enhanced elastomeric properties.

It is an object of this invention to provide a process for preparing polymers, which is economical and commercially practicable, and which utilizes readily available materials. Another object of this invention is to provide a new class of polyurethane polymers which has non-brittle and low shrinking characteristics.

A further object of this invention is to provide a new class of urethane polymers which may be prepared in a medium of reactive solvents, such as vinyl monomers, and which possess a good pot life.

These and other objects of this invention are accomplished by providing a new class of urethane polymers having an ordered arrangement of pendant unsaturation. The polymers are prepared by a process which comprises reacting:

(A) a material selected from the group consisting of
  (1) an isocyanate-terminated adduct having an average isocyanate functionality of about 1.3 to 2.0 and having an equivalent weight in the range of about 360 to 2,000, which is the reaction product of an isocyanate-terminated prepolymer having a functionality greater than two and a compound selected from the group consisting of unsaturated monohydroxy, monocarboxy, monoamino and monomercapto compounds containing a terminal —CH=CH$_2$ group, and
  (2) hydroxy-terminated partially esterified adduct having an average hydroxyl functionality of about 1.3 to 2.0 and having an equivalent weight in the range of about 100 to 1,600, which is the reaction product of a polyether polyol having a functionality greater than two and an unsaturated monocarboxy acid containing a terminal —CH=CH$_2$ group with
(B) a chain-extending agent having an equivalent weight in the range of about 200 to 4,000 and which is selected from the group consisting of difunctional hydroxy-, carboxy-, amino- and mercapto-terminated polyether, polyester and polyurethane compounds when said material is an isocyanate-terminated adduct and which is selected from the group consisting of isocyanate-terminated polyether, polyester and polyurethane compounds when said material is a hydroxy-terminated partially esterified adduct, thereby obtaining a urethane polymer having a molecular weight in the range of about 1,200 to 48,000 and an equivalent weight per one of said —CH=CH$_2$ group in the range of about 400 to 8,000.

The isocyanate-terminated adduct of this invention contains at least one side group possessing a terminal —CH=CH$_2$ group and is prepared by reacting a monofunctional unsaturated compound with an isocyanate-terminated prepolymer having a functionality greater than two. The isocyanate-terminated prepolymer is prepared by procedures well known in the art, such as described in U.S. Patent No. 3,049,513. Thus, about one molar proportion of a polyol, such as a propylene oxide adduct of trimethylolpropane, is reacted under substantially anhydrous conditions with about one molar proportion of an organic diisocyanate for each hydroxyl group of the polyol to produce an isocyanate-terminated urethane prepolymer having a free NCO group at each terminus of the molecule. When the polyol is a triol, an abbreviated formula for the prepolymer can be represented as:

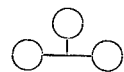

the circles representing the diisocyanate molecules and the urethane linkage being omitted. Likewise, if the polyol is a tetrol, the prepolymer can be represented as:

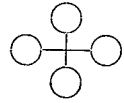

the circles representing the diisocyanate molecules and the urethane linkages being omitted.

Any of the wide variety of organic diisocyantes may be employed to react with the polyols to prepare these polyurethane polymers, including aromatic, aliphatic and cycloaliphatic diisocyanates and combinations of these types. It is to be understood that mixtures of two or more organic diisocyanates may be used. Representative compounds include toluene-2,4-diisocyanates, m-phenylene diisocyanate, 4-chloro-1,3-phenylene diisocyanate, 4,4'-diphenylmethane diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthylene diisocyanate. Arylene diisocyanates, i.e., those in which each of the two isocyanate groups is attached directly to an aromatic ring, are preferred. Compounds such as toluene-2,4-diisocyanate in which the two isocyanate groups differ in reactivity are particularly desirable.

The isocyanate-terminated adduct of this invention has an average isocyanate functionality of about 1.3 to 2.0 and is prepared by reacting for each mole of the isocyanate-terminated prepolymer an average of about $(n-2)$ to $(n-1.3)$ moles of a monofunctional unsaturated compound having a terminal $-CH=CH_2$ group, in which $n$ equals the number of terminal isocyanate groups contained in the prepolymer. Thus, a prepolymer prepared from a triol would have three terminal NCO groups and each mole of the prepolymer would be reacted with an average of about 1.0 to 1.7 moles (3–2.0 to 3–1.3 moles) of the monofunctional unsaturated compound. Likewise, a prepolymer prepared from the tetrol would have four terminal NCO groups and each mole of the prepolymer would be reacted with an average of about 2.0 to 2.7 moles (4–2.0 to 4–1.3 moles) of the monofunctional unsaturated compound.

The monofunctional unsaturated compounds useful in the practice of this invention are selected from the group consisting of monohydroxy, monocarboxy, monoamino and monomercapto compounds containing a terminal $-CH=CH_2$ group. These compounds may be represented by the formula: $CH_2=CH-R-X$, wherein R stands for an alkylene or arylene radical and wherein X may be an OH, COOH, $NH_2$ or SH group. Representative monohydroxy unsaturated compounds are allyl alcohol, glycerol diallyl ether, trimethylolpropane diallyl ether, monohydroxy ethyl-butene-2,3-alcohol, allyl vinyl carbinol, diallyl carbinol, diallyl oxypropano, and the like. Representative monocarboxy unsaturated compounds are acrylic acid, methacrylic acid, oleic acid, ricinoleic acid, itaconic acid, and the like. It is to be understood that unsaturated esters which enter into transesterification reactions are also contemplated but not preferred in the practice of this invention. Representative monoamino unsaturated compounds are such as allyl amine, diallyl amine, and the like. Representative monomercapto compounds are such as 1-butene-4-thiol, 1-pentene-5-thiol, 1-hexene-6-thiol, and the like.

The reaction between the isocyanate-terminated prepolymer and one of the monofunctional unsaturated compounds listed above to produce an isocyanate-terminated adduct having an average isocyanate functionality of about 1.3 to 2.0 is carried out under conditions well known in the art for reacting an isocyanate-terminated compound with an organic reactive-hydrogen compound, i.e., in any suitable mixing equipment, at a temperature of about 60° C. to 120° C., under substantially anhydrous conditions, and with or without a catalyst. When the propolymer is prepared from a tetrol, as illustrated above, an abbreviated formula for a difunctional isocyanate-terminated adduct may be represented as:

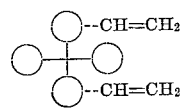

the circles representing the diisocyanate molecules and all the linkages being omitted. The equivalent weight of the prepolymer is selected such that the equivalent weight of the isocyanate-terminated adduct per NCO group is in the range of about 360 to 2,000. An equivalent weight of about 500 to 1,000 is preferred. This equivalent weight range is necessary in order that the terminal unsaturated $-CH=CH_2$ groups will be sufficiently pendant from the backbone of the urethane polymer. This structural arrangement results in a urethane polymer possessing enhanced elasticity and ease of cure.

The hydroxy-terminated partially esterified adduct of this invention has an average hydroxyl functionality of about 1.3 to 2.0 and contains at least one side group possessing a terminal $-CH=CH_2$ group. It is prepared by reacting a polyol which has a functionality greater than two, such as that used in the preparation of the isocyanate-terminated prepolymer above, with an unsaturated monocarboxy acid, such as that described above in the preparation of the difunctional isocyanate-terminated adduct. The conditions under which the reaction is carried out are those well known in the art and generally used in the preparation of ester linkages. Thus, the thydroxyl-containing compound and the carboxyl-containing compound may be charged into a reaction flask equipped with a stirring means, thermometer, nitrogen gas means, water trap, and heating mantel. The reaction is carried out at a temperature of about 120° C. to 200° C. and under a blanket of nitrogen. A catalyst, such as toluene sulfonic acid, and an antioxidant, such as hydroquinone, are generally employed. The polyol and unsaturated monocarboxy acid reactants are reacted in the same stoichiometric ratios described for the reactants used in preparing the isocyanate-terminated adduct above.

When the polyol is a polyether tetrol, as discussed above, and the unsaturated monocarboxy acid is acrylic acid, an abbreviated formula for a difunctional hydroxy-terminated partially esterified adduct may be represented as:

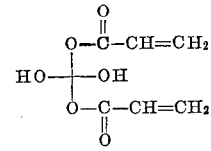

The equivalent weight of the polyol is selected such that the equivalent weight of the hydroxy-terminated adduct per OH group is in the range of about 100 to 1,600. An equivalent weight of about 200 to 800 is preferred. This equivalent weight range is necessary in order that the terminal unsaturated $-CH=CH_2$ groups will be sufficiently pendant from the backbone of the urethane polymer to impart enhanced elasticity and ease of cure.

The adducts prepared above are chain-extended with a chain-extending agent, selected from the group consisting of difunctional hydroxy-, carboxy-, amino-, mercapto- and isocyanate-terminated polyether, polyester and polyurethane compounds, to produce the urethane polymers of this invention.

Representative difunctional hydroxy-terminated polyether, polyester and polyurethane compounds include polyoxyalkylene glycols, polyoxyalkylene aryl compounds, glycol and dicarboxylic acid condensation products in which not all of the alcohol groups are reacted, condensation products of glycols and ε-caprolactone, reaction products of an organic diisocyanate with an excess of a glycol or a hydroxyl-terminated polyether, reaction products of isocyanate-terminated polyurethane prepolymers with an excess of a hydroxy-terminated compound, and the like. The glycols disclosed in U.S. Patent No. 3,148,173 may also be used.

Representative difunctional carboxy-terminated polyether, polyester and polyurethane compounds include dicarboxylic acid and glycol condensation products in which not all the carboxyl groups are reacted with alcohol groups, reaction products of dicarboxylic acids with polyoxyalkylene glycols, reaction products of organic diisocyanates with excess acid polyesters, reaction products of isocyanate-terminated polyurethane prepolymers with excess carboxy-terminated compounds, and the like.

Representative difunctional amino-terminated polyether, polyester and polyurethane compounds include amine-terminated glycols and polyethers prepared by direct amination or cyanoethylation and hydrogenation of the corresponding glycols and polyethers, aliphatic diamines, aryl diamines, alkyl aryl diamines, reaction products of dicarboxylic acids with excess diamine compounds, reaction products of organic diisocyanates with excess aliphatic and aromatic diamines, reaction products of isocyanate-terminated polyurethane prepolymers with excess aliphatic and aromatic diamines, and the like.

Representative difunctional mercapto-terminated polyether, polyester and polyurethane compounds include aliphatic dithiols, aromatic dithiols, polyoxyalkylene dithiols, polyester dithiols, reaction products of organic diisocyanates and dithiols, and reaction products of isocyanate-terminated polyurethane prepolymers and dithiols. The polyalkyleneether-polythioether glycols, whose formula and method of preparation are described in U.S. Patent No. 3,148,173, may also be used.

Representative difunctional isocyanate-terminated polyether, polyester and polyurethane compounds include reaction products of polyoxyalkylene glycols with an excess of an organic diisocyanate, reaction products of hydroxy- and carboxy-terminated difunctional polyesters with an excess of an organic diisocyanate, and reaction products of difunctional polyurethane compounds terminated with reactive hydrogen-containing groups, as determined by the Zerewitinoff reaction, and an excess of an organic diisocyanate. The isocyanate-terminated prepolymers and starting materials described and prepared according to U.S. Patent No. 3,148,173 may also be used as chain-extending agents or components thereof in the practice of this invention.

When the adduct is isocyanate-terminated, the chain-extending agent may be hydroxy-, carboxy-, amino- or mercapto-terminated. When the adduct is hydroxy-terminated, the chain-extending agent is isocyanate-terminated. The chain-extending agents mentioned above are all well-known compounds and are readily available to those skilled in the art. The chain-extending agents utilized are those having an equivalent weight in the range from about 200 to 4,000. Those having an equivalent weight of about 500 to 2,500 are preferred. The equivalent weight of the chain-extending agent is carefully controlled in order that in the chain-extension reaction the pendant unsaturated groups may be spaced in an ordered arrangement along the backbone of the urethane polymer.

The conditions under which the difunctional chain-extending agents and the above adducts are reacted to prepare the urethane polymers of this invention are well known in the art. Thus melt, emulsion, solvent, and the like, polymerization techniques may be utilized. Solvent polymerization is preferred. Solvents which may be used are toluene, xylene, styrene, vinyl benzene, and the like. Solvents such as styrene and other vinyl monomers, in which the urethane polymer produced may be cured by copolymerization with peroxide catalysts, are preferred. The reaction is carried out by charging the chain-extending agent, adduct prepared above, and solvent to a reaction vessel equipped with stirring and heating means. The reaction is conducted at a temperature of about 70° C. to 90° C. and for a period of about two hours. A catalyst, such as a tertiary amine, stannous octoate, and the like, is generally employed. The urethane polymer produced may be recovered from the solvent by vacuum distillation.

It is desired that the urethane polymer of this invention have a molecular weight in the range from about 1,200 to 48,000. A molecular weight of about 2,000 to 24,000 is preferred. The urethane polymer has an equivalent weight per one —$CH=CH_2$ group of from about 400 to 8,000. If too many —$CH=CH_2$ groups are present, the stability of the polymer is impaired and the cured elastomeric product becomes too brittle. If there are not enough —$CH=CH_2$ groups present, curing of the urethane polymer is inhibited. Also, the cured product, prepared with a urethane polymer deficient in —$CH=CH_2$ groups, will be too soft and tacky, thus presenting poor handling characteristics and physical properties. It should be apparent that the degree of unsaturation can be varied by adjusting the equivalent weight of either the reactants used in the preparation of the adducts or the chain-extending agent. Thus, the number of pendant groups containing terminal —$CH=CH_2$ groups can be readily computed from the equivalent weight of the adduct, the equivalent weight of the chain-extending agent, and the weight ratios of these reactants employed to produce the urethane polymers of this invention. A study of the examples below will more fully demonstrate this calculation.

The urethane polymers of this invention may be cured according to conventional sulfur curing procedures. Thus, the polymer is milled to a smooth sheet on a rubber mill with sulfur and various other additives and compounding agents, such as catalysts, activating agents, vulcanization accelerators, copolymerizable compounds, fillers, pigments, refinishing substances, and the like. The milled stock is sheeted off the mill, placed in suitable molds, and the curing process completed by the application of heat and pressure. Various procedures and modifications of sulfur curing are more particularly described in Encyclopedia of Chemical Technology, Kirk and Orthmer, published by Interscience Encyclopedia, Inc., New York, 1953, vol. 11, pages 892–927; Principles of High-Polymer Theory and Practice, Schmidt and Marlies, published by McGraw-Hill Book Company, Inc., New York, 1948, pages 556–566; and Chemistry and Technology of Rubber, Davis and Blake, published by Reinhold Publishing Corporation, New York, 1937, vol. 74, chapter VI.

The urethane polymers of this invention may also be cured by reaction with from about 10 to 100 weight percent of a copolymerizable vinyl monomeric compound at a temperature of about 30° C. to 120° C. The urethane polymer is either dissolved in the copolymerizable vinyl compound or the vinyl compound may be used as a solvent in the urethane polymer preparation as described above. It is advisable to add to this solution a polymerization retarding agent, such as, for example, hydroquinone, copper or cuprous salts, for stabilization purposes. The polymerization of these solutions takes place preferably in the presence of a polymerization catalyst, comprising an organic peroxide, such as, for example, benzoyl peroxide, cyclohexanone peroxide and cumene peroxide, and an accelerator comprising a heavy metal siccative, such as, for example, cobalt, lead and manganese compounds which are soluble in the reaction mixtures. Examples of suitable heavy metal siccatives include the naphthenates, octoates, oleates and halides of cobalt, lead and manganese or other metal salts which are usually used for the processing of drying oils.

Any suitable copolymerizable vinylidene compound may be utilized in the practice of the invention, representative examples including styrene, methacrylic esters, acrylic esters, vinyl toluene, divinyl benzene, diallyl phthalate and triallyl cyanurate. The copolymerizable vinylidene compound may constitute from about 10 to 100 weight percent, preferably about 40 to about 80 percent, of the mixture to be copolymerized.

The invention is further illustrated but not limited by the following examples in which parts and percentages given are by weight. At used herein, equivalent weight is the molecular weight of the compound per hydroxyl, NCO or —$CH=CH_2$ group, as specified. The molecular weights of the urethane polymers are calculated from the molecular weights and mole ratios of the reactants. The molecular weights of the polyols are calculated from their hydroxyl numbers according to the formula:

Molecular weight =
$$\frac{56.1 \times 1000 \times \text{number of hydroxly groups}}{\text{hydroxyl number}}$$

The hydroxyl number is determined according to the "Phenyl Isocyanate Method for Hydroxyl Determination" as described by Reed, D. H. et al., Anal. Chem., 35, pp. 571–73, April, 1963.

Unsaturation values for the hydroxy-terminated partially esterfied adducts were determined by the hydrogenation method of Clausson, N. et al., as described on page 322, "Quantitative Organic Analysis Via Functional Groups," S. Siggia, 3rd edition, John Wiley & Sons, N. Y., 1963.

ASTM Designation D412 was used to evaluate stress-strain, tensil strength and ultimate elongation properties. The tensile testing machine was an Instron Model TPC–M–1. The hardness of the cured elastomeric urethane polymers was measured with a Shore Type "A" Durometer. The method used was according to ASTM Designation D676–59T.

EXAMPLE 1

(A) Preparation of isocyanate-Terminated adduct.— 696 grams (4 moles) of tolylene diisocyanate were charged into a reaction flask equipped with a thermometer, stirring means, nitrogen gas means, and a heating mantel. 550 grams (1 mole) of a polyether tetrol (propylene oxide adduct of pentaerythritol, molecular weight 550) was added to the reaction flask under a blanket of nitrogen with stirring and maintaining the reaction temperature at about 80° C. The reaction was then continued by heating at about 80° C. for one hour. The isocyanate-terminated prepolymer so produced was diluted in the reaction flask to 80 weight percent solids by the addition of 376.5 grams of styrene, protected against oxidation by the addition of 1.6 grams of hydroquinone-antioxidant, and reacted with 260 grams (2 moles) of propylene glycol monomethacrylate, molecular weight 130, by heating at a temperature of about 80° C. for one hour. The isocyanate-terminated adduct produced had an NCO functionality of two, an equivalent weight per NCO group of 753, and contained two side chains terminated in —CH=CH$_2$ groups. The adduct was then diluted to 60 weight percent solids by the addition of 627.5 grams of styrene.

(B) Preparation of chain-extending agent. — 1,816 grams (2 moles) of an isocyanate-terminated adduct of oxypropylated-bisphenol A (molecular weight 560) and tolylene diisocyanate; 948 grams (1 mole) of an isocyanate-terminated adduct of polypropylene glycol (molecular weight 600) and tolylene diisocyanate; and 472 grams (4 moles) of 1,6-hexane diol and 2157.3 grams of styrene were charged into a reaction flask equipped with a thermometer, stirring means, nitrogen gas means and heating mantel. The reaction was carried out under a blanket of nitrogen gas at a temperature of about 80°–90° C. for about two hours. The linear hydroxy-terminated polyurethane chain-extending agent produced had a molecular weight of 3,236, an equivalent weight per hydroxyl group of 1,618, and represented 60 weight percent solids in styrene.

(C) Preparation of urethane polymer.—7,530 grams (3 moles) of the isocyanate-terminated adduct in 60 weight percent styrene prepared in (A) above and 21,573 grams (4 moles) of the hydroxy-terminated polyurethane chain-extending agent in 60 weight percent styrene prepared in (B) above were placed in a reaction flask with 2.9 grams stannous octoate catalyst and reacted at about 80°–90° C. for two hours. The urethane polymer produced was hydroxy-terminated and had a molecular weight of 17,462, an equivalent weight per one hydroxyl group of 8,731 and an equivalent weight per one

—CH=CH$_2$ group of 2,910.

(D) Curing of the urethane polymer in vinyl monomer.— To 60 grams of the urethane polymer prepared in (C) above, suspended in a reaction vessel in 40 grams of styrene, 60 weight percent solids, were added 0.15 gram cobalt naphthenate and 1.5 grams methyl ethyl ketone peroxide. The mixture was cured by heating at a temperature of about 90° C. for 30 minutes. The properties of the cured elastomeric urethane polymer were as follows:

Tensile strength _____ 3480
Elongation, percent _____ 210
Modulus at 100% elongation _____ 1420
Shore A hardness _____ 56

(E) Sulfur curing of the urethane polymer.—The urethane polymer prepared in (C) above was isolated by vacuum distillation at a temperature of about 50° C. and a pressure of about 1.0 millimeter of mercury. 100 grams of the urethane polymer, 1.0 gram sulfur, 2.0 grams benzothiazyl disulfide, 1.0 gram zinc p-methoxy-dithiocarbanilate, and 1.0 gram mercaptobenzothiazole were pigmented with 20 grams of furnace black and the mixture blended on a rubber mill. The blended compounds were placed in a mold and cured in a press by heating for one hour at about 140° C. The properties of the sulfur-cured elastomeric urethane polymer were as follows:

Tensile strength _____ 2860
Elongation, percent _____ 550
Modulus at 100% elongation _____ 640
Shore A hardness _____ 42

EXAMPLE 2

(A) Preparation of isocyanate-terminated adduct.— 750 grams (3 moles) of diphenyl methane diisocyanate were charged into a reaction flask equipped with a thermometer, stirring means, nitrogen gas means, and a heating mantel. 420 grams (1 mole) of a polyether triol (propylene oxide adduct of trimethylolpropane, molecular weight 420) was added to the reaction flask under a blanket of nitrogen with stirring and maintaining the reaction temperature at about 80° C. The reaction was then continued by heating at about 80° C. for one hour. The isocyanate-terminated prepolymer so produced was diluted in the reaction flask to 80 weight percent solids by the addition of 322.2 grams of styrene, protected against oxidation by the addition of 1.5 grams of hydroquinone-antioxidant, and reacted with 119 grams (1.66 moles) of acrylic acid, molecular weight 72, by heating at a temperature of about 80°–90° C. for one hour. The prepolymer and acrylic acid reaction was catalyzed by the addition of 0.16 gram of tin octoate catalyst and was evidenced by the evolution of carbon dioxide. The isocyanate-terminated adduct produced had an average NCO functionality of 1.33, an equivalent weight per NCO group of 969, and contained an average of 1.66 side chains terminated in —CH=CH$_2$ groups. The adduct was then diluted to 60 weight percent solids by the addition of 537.1 grams of styrene.

(B) Preparation of chain-extending agent. — 2,025 grams (3 moles) oxypropylated-bisphenol A, molecular weight 675, 680 grams of styrene and 696 grams (4 moles) of tolylene diisocyanate were charged into a reaction flask equipped with a thermometer, stirring means, nitrogen gas means and a heating mantel. The reaction was carried out under a blanket of nitrogen gas at a temperature of about 80°–90° C. for about two hours. To the product in the reaction flask was added 180 grams (2 moles) 1,4-butane diol, 1,254 grams styrene, 0.5 gram stannous octoate catalyst, and the reaction was continued for an additional two hours at about 80°–90° C. The linear hydroxy-terminated chain-extending agent produced had a molecular weight of 2,901, an equivalent weight per hydroxyl group of 1,451, and represented 60 weight percent solids in styrene solvent.

(C) Preparation of urethane polymer.—6,445 grams (3 moles) of the isocyanate-terminated adduct in 60 weight percent styrene prepared in (A) above and 9,670 grams (2 moles) of the hydroxy-terminated polyurethane chain-extending agent in 60 weight percent styrene prepared in (B) above were placed in a reaction flask with 1.6 grams stannous octoate catalyst and reacted at about 80°–90° C. for two hours. The urethane polymer so produced possessed terminal chains and side chains terminated with —CH=CH$_2$ groups and had a molecular weight of 9,669 and an equivalent weight per one —CH=CH$_2$ group of 1,934.

(D) Curing of the urethane polymer in vinyl monomer.—To 60 grams of the urethane polymer prepared in (C) above, suspended in a reaction vessel in 40 grams of styrene, 60 weight percent solids, were added 0.15 gram cobalt naphthenate and 1.5 grams methyl ethyl ketone peroxide. The mixture was cured by heating at a temperature of about 90° C. for 30 minutes. The properties of the cured elastomeric urethane polymer were as follows:

| | |
|---|---|
| Tensile strength | 4520 |
| Elongation, percent | 160 |
| Modulus at 100% elongation | 2430 |
| Shore A hardness | 64 |

(E) Sulfur curing of the urethane polymer.—The urethane polymer prepared in (C) above was isolated by vacuum distillation at a temperature of about 50° C. and a pressure of about 1.0 millimeter of mercury. 100 grams of the urethane polymer. 2.0 grams sulfur, 4.0 grams 2-benzothiazyl disulfide, 2.0 grams 2-mercapto-imidazoline and 0.2 gram anhydrous zinc chloride were pigmented with 25 grams of furnace black and the mixture blended on a rubber mill. The blended compounds were placed in a mold and cured in a press by heating for one hour at about 140° C. The properties of the sulfur-cured elastomeric urethane polymer were as follows:

| | |
|---|---|
| Tensile strength | 3220 |
| Elongation, percent | 400 |
| Modulus at 100% elongation | 1100 |
| Shore A hardness | 56 |

EXAMPLE 3

(A) Preparation of isocyanate-terminated adduct.—Hexamethylene diisocyanate in the amount of 672 grams (4 moles) was charged into a reaction flask equipped with a thermometer, stirring means, nitrogen gas means, and a heating mantel. 600 grams (1 mole) of a polyether tetrol (propylene oxide adduct of pentaerythritol, molecular weight 600) was added to the reaction flask under a blanket of nitrogen with stirring and maintaining the reaction temperature at about 80° C. The reaction was then continued by heating at about 80° C. for one hour. The isocyanate-terminated prepolymer produced was diluted in the reaction flask to 80 weight percent solids by the addition of 346.6 grams of vinyl toluene, protected against oxidation by the addition of 1.6 grams of hydroquinone-antioxidant, and reacted with 114.4 grams (2.66 moles) of allyl amine, molecular weight 43, by heating at a temperature of about 80° C. for one hour. The isocyanate-terminated adduct produced had an NCO functionality of 1.33, an equivalent weight per NCO group of 1,042, and contained an average of 2.66 side chains terminated in —CH=CH$_2$ groups. The adduct was then diluted to 60 weight percent solids by the addition of 577.7 grams of vinyl toluene.

(B) Preparation of chain-extending agent.—2,244 grams (3 moles) of a hydroxy-terminated polyester, prepared from 1 mole of phthalic anhydride, 1 mole of 1,4-butane glycol and 1.5 moles of propylene glycol; 348 grams (2 moles) of tolylene diisocyanate; and 1,728 grams of styrene were charged into a reaction flask equipped with a thermometer, stirring means, nitrogen gas means and a heating mantel. The reaction was carried out under a blanket of nitrogen gas at a temperature of about 80°–90° C. for about two hours. The linear hydroxy-terminated polyurethane chain-extending agent produced had a molecular weight of 2,592, an equivalent weight per hydroxyl group of 1,296, and represented 60 weight percent solids in styrene solvent.

(C) Preparation of urethane polymer.—6,932 grams (3 moles) of the isocyanate-terminated adduct in 60 weight percent vinyl toluene prepared in (A) above and 8,640 grams (2 moles) of the hydroxy-terminated polyurethane chain-extending agent in 60 weight percent styrene prepared in (B) above were placed in a reaction flask with 1.6 grams lead naphthenate catalyst and reacted at about 80°–90° C. for two hours. The urethane polymer so produced possessed terminal chains and side chains terminated with —CH=CH$_2$ groups and had a molecular weight of 9,343 and an equivalent weight per one —CH=CH$_2$ group of 1,168.

(D) Curing the urethane polymer in vinyl monomer.—To 60 grams of the urethane polymer prepared in (C) above, suspended in a reaction vessel in 40 grams styrene and vinyl toluene (60 weight percent solids) were added 0.15 gram cobalt naphthenate and 2 grams benzoyl peroxide. The mixture was cured by heating at a temperature of about 90° C. for 30 minutes. The properties of the cured elastomeric urethane polymer were as follows:

| | |
|---|---|
| Tensile Strength | 5920 |
| Elongation, percent | 60 |
| Shore A hardness | 76 |

(E) Sulfur curing of the urethane polymer.—The urethane polymer prepared in (C) above was isolated by vacuum distillation at a temperature of about 50° C. and a pressure of about 1.0 millimeter of mercury. 100 grams of the urethane polymer, 3 grams sulfur, 2 grams di-orthotolyl guanidine, 3 grams di-pentamethylene thiuram tetrasulfide, and 0.3 gram anhydrous zinc chloride were pigmented with 20 grams of furnace black and the mixture blended on a rubber mill. The blended compounds were placed in a mold and cured in a press by heating for one hour at about 140° C. The properties of the sulfur-cured elastomeric urethane polymer were as follows:

| | |
|---|---|
| Tensile strength | 4500 |
| Elongation, percent | 220 |
| Modulus at 100% elongation | 2400 |
| Shore A hardness | 70 |

EXAMPLE 4

(A) Preparation of hydroxy-terminated partially esterified adduct.—400 grams (1 mole) of a polyether tetrol (propylene oxide adduct of pentaerythritol, molecular weight 400) were charged into a reaction flask equipped with a thermometer, stirring means, nitrogen gas means, water trap, and a heating mantel. The temperature of the reaction flask was raised to about 130°–135° C. and 7.9 grams toluene sulfonic acid catalyst, 0.6 gram hydroquinone-antioxidant and 144 grams (2 moles) of acrylic acid were added to the flask under a blanket of nitrogen with stirring. The temperature was maintained at about 130°–135° C. for about two hours until 2 moles of water, 36 grams, were recovered in the water trap.

The adduct so prepared was washed with saturated sodium chloride solution, neutralized with sodium bicarbonate, decolorized, filtered, and dried overnight in a vacuum at 105° C. The hydroxy-terminated, partially esterified adduct produced had a hydroxyl functionality of two and an equivalent weight per hydroxyl group of 254.

The adduct possessed two side chains terminated in —CH=CH₂ groups and had the following properties:

|  | Theoretical | Found |
| --- | --- | --- |
| Unsaturation, moles/gram | 3.96 | 3.74 |
| Equivalents of unsaturation/mole | 2.00 | 1.88 |
| Hydroxyl number | 222.0 | 221.5 |
| Hydroxyl equivalents/mole | 2.00 | 1.99 |

(B) Preparation of chain-extending agent.—1,696 grams (2 moles) of an isocyanate-terminated adduct of oxypropylated-bisphenol A (molecular weight 500) and tolylene diisocyanate; 1,896 grams (2 moles) of an isocyanate-terminated adduct of polypropylene glycol (molecular weight 600) and tolylene-diisocyanate; 354 grams (3 moles) of 1,6-hexane diol and 2,630 grams of styrene were charged into a reaction flask equipped with a thermometer, stirring means, nitrogen gas means and a heating mantel. The reaction was carried out under a blanket of nitrogen gas at a temperature of about 80°–90° C. for about two hours. The linear isocyanate-terminated polyurethane chain-extending agent produced had a molecular weight of 3,946, an equivalent weight per isocyanate group of 1,973, and represented 60 weight percent solids in styrene.

(C) Preparation of urethane polymer.—2,032 grams (4 moles) of the hydroxy-terminated partially esterified adduct prepared in (A) above, 19,728 grams (3 moles) of the isocyanate-terminated polyurethane chain-extending agent in 60 weight percent styrene prepared in (B) above, 3,456 grams vinyl toluene and 2.5 grams stannous octoate catalyst were placed in a reaction flask and reacted at about 80°–90° C. for two hours. The urethane polymer so produced was hydroxy-terminated and had a molecular weight of 13,869, an equivalent weight per one hydroxyl group of 6,935 and an eqiuvalent weight per one —CH=CH₂ group of 1,734.

(D) Curing of the urethane polymer in vinyl monomer.—To 55 grams of the urethane polymer prepared in (C) above, suspended in a reaction vessel in 45 grams of styrene, 55 weight percent solids, were added 0.15 gram cobalt naphthenate and 2.0 grams benzoyl peroxide. The mixture was cured by heating at a temperature of about 90° C. for 30 minutes. The properties of the cured elastomeric urethane polymer were as follows:

| | |
| --- | --- |
| Tensile strength | 5460 |
| Elongation, percent | 20 |
| Shore A hardness | 70 |

(E) Sulfur curing of the urethane polymer.—The urethane polymer prepared in (C) above was isolated by vacuum distillation at a temperature of about 50° C. and a pressure of about 1.0 millimeter of mercury. 100 grams of the urethane polymer, 2.0 grams sulfur, 2.5 grams benzothiazyl disulfide, 1.0 gram mercaptobenzothiazole and 1.0 gram zinc p-methoxydithiocarbanilate were pigmented with 15 grams of furnace black and the mixture blended on a rubber mill. The blended compounds were placed in a mold and cured in a press by heating for one hour at about 140° C. The properties of the sulfur-cured elastomeric urethane polymer were as follows:

| | |
| --- | --- |
| Tensile strength | 4320 |
| Elongation, percent | 340 |
| Modulus at 100% elongation | 1600 |
| Shore A hardness | 65 |

The urethane polymers prepared according to this invention have many uses. Examples 1–4 illustrate the excellent physical properties, stress-strain, tensile strength, elongation, and the like, of the cured elastomeric urethane polymers. The above examples indicate that the urethane polymers may be cured by conventional sulfur, rubber curing techniques. The urethane polymers are also shown to have good pot life in vinyl monomers in which they may be ultimately and conveniently cured to produce products of enhanced tensile strength, modulus, and the like, properties. When employed in vinyl monomers, the urethane polymer presents a 100% reactive, one-component, elastomeric system. The urethane polymers of this invention may be utilized in the preparation of tires, hoses, footwear, and a wide variety of coated or molded articles. The cured urethane polymers are characterized by excellent stability, flexibility, and low shrinking characteristics.

As many widely different embodiments of this invention may be made without departing from the spirit and scope thereof, it is understood that this invention is not limited, except as defined in the appended claims.

What is claimed is:

1. A urethane polymer having an ordered arrangement of pendant unsaturation prepared by reacting:
   (A) a material selected from the group consisting of
      (1) an isocyanate-terminated adduct having an average isocyanate functionality of about 1.3 to 2.0 and having an equivalent weight in the range of about 360 to 2,000, which is the reaction product of an isocyanate-terminated polyether prepolymer having a functionality greater than two and a compound selected from the group consisting of unsaturated monohydroxy, monocarboxy, monoamino and monomercapto compounds containing a terminal —CH=CH₂ group, and
      (2) a hydroxy-terminated partially esterified adduct having an average hydroxyl functionality of about 1.3 to 2.0 and having an equivalent weight in the range of about 100 to 1,600, which is the reaction product of a polyether polyol having a functionality greater than two and an unsaturated monocarboxy acid containing a terminal —CH=CH₂ group with
   (B) a chain-extending agent having an equivalent weight in the range of about 200 to 4,000 and which is selected from the group consisting of difunctional hydroxy-, carboxy-, amino- and mercapto-terminated polyether, polyester and polyurethane compounds when said material is an isocyanate-terminated adduct and which is selected from the group consisting of isocyanate-terminated polyether, polyester and polyurethane compounds when said material is a hydroxy-terminated partially esterified adduct, thereby obtaining a urethane polymer having a molecular weight in the range of about 1,200 to 48,000 and an equivalent weight per one of said —CH=CH₂ groups in the range of about 400 to 8,000.

2. The urethane polymer of claim 1 wherein said material is an isocyanate-terminated adduct having an average isocyanate functionality of about 1.3 to 2.0 and having an equivalent weight in the range of about 500 to 1,000, and said chain-extending agent has an equivalent weight in the range of about 500 to 2,500.

3. The urethane polymer of claim 1 wherein said material is a hydroxy-terminated partially esterified adduct having an average hydroxyl functionality of about 1.3 to 2.0 and having an equivalent weight in the range of about 200 to 800 and said chain-extending agent has an equivalent weight in the range of about 500 to 2,500.

4. The urethane polymer of claim 2 wherein said isocyanate-terminated adduct is the reaction product of an isocyanate-terminated prepolymer having a functionality greater than two and a monohydroxy compound containing a terminal —CH=CH₂ group.

5. The urethane polymer of claim 2 wherein said isocyanate-terminated adduct is the reaction product of an isocyanate-terminated prepolymer having a functionality greater than two and a monocarboxy compound containing a terminal —CH=CH₂ group.

6. The urethane polymer of claim 2 wherein said isocyanate-terminated adduct is the reaction product of an isocyanate-terminated prepolymer having a functionality greater than two and a monoamino compound containing a terminal —CH=CH₂ group.

7. The urethane polymer of claim 2 wherein said chain-extending agent is a difunctional hydroxy-terminated polyurethane compound.

8. The urethane polymer of claim 3 wherein said hydroxy-terminated partially esterified adduct is the reaction product of a propylene oxide adduct of pentaerythritol and acrylic acid.

9. The urethane polymer of claim 3 wherein said chain-extending agent is a difunctional isocyanate-terminated polyurethane compound.

10. A process for making the urethane polymer of claim 1 having an ordered arrangement of pendant unsaturation which comprises reacting:
(A) a material selected from the group consisting of
   (1) an isocyanate-terminated adduct having an average isocyanate functionality of about 1.3 to 2.0 and having an equivalent weight in the range of about 360 to 2,000, which is the reaction product of an isocyanate-terminated polyether prepolymer having a functionality greater than two and a compound selected from the group consisting of unsaturated monohydroxy, monocarboxy, monoamino and monomercapto compounds containing a terminal $-CH=CH_2$ group, and
   (2) a hydroxy-terminated partially esterified adduct having an average hydroxyl functionality of about 1.3 to 2.0 and having an equivalent weight in the range of about 100 to 1,600, which is the reaction product of a polyether polyol having a functionality greater than two, and an unsaturated monocarboxy acid containing a terminal $-CH=CH_2$ group with
(B) a chain-extending agent having an equivalent weight in the range of about 200 to 4,000 and which is selected from the group consisting of difunctional hydroxy-, carboxy-, amino- and mercapto-terminated polyether, polyester and polyurethane compounds when said material is an isocyanate-terminated adduct and which is selected from the group consisting of isocyanate-terminated polyether, polyester and polyurethane compounds when said material is a hydroxy-terminated partially esterified adduct,
thereby obtaining a urethane polymer having a molecular weight in the range of about 1,200 to 48,000 and an equivalent weight per one of said $-CH=CH_2$ groups in the range of about 400 to 8,000.

11. The process according to claim 10 wherein said material is an isocyanate-terminated adduct having an average isocyanate functionality of about 1.3 to 2.0 and having an equivalent weight in the range of about 500 to 1,000, and said chain-extending agent has an equivalent weight in the range of about 500 to 2,500.

12. The process according to claim 10 wherein said material is a hydroxy-terminated partially esterified adduct having an average hydroxyl functionality of about 1.3 to 2.0 and having an equivalent weight in the range of about 200 to 800, and said chain-extending agent has an equivalent weight in the range of about 500 to 2,500.

13. A cured elastomeric polymer obtained by heating the urethane polymer of claim 1 to a temperature of at least about 125° C. with sulfur in the presence of a vulcanization accelerator.

14. A cured elastomeric polymer obtained by heating the urethane polymer of claim 1 at a temperature of about 30°–120° C. with from about 10 to 100 weight percent of a copolymerizable vinyl monomer in the presence of a peroxide catalyst.

References Cited

UNITED STATES PATENTS

| | | | |
|---|---|---|---|
| 2,879,248 | 3/1959 | Nischk | 260—859 |
| 2,915,493 | 12/1959 | Nischk | 260—859 |
| 2,917,486 | 12/1959 | Nelson | 260—45.9 |
| 3,008,917 | 11/1961 | Park | 260—859 |
| 3,100,759 | 8/1963 | Boussu | 260—77.5 |
| 3,288,883 | 11/1966 | Temin | 260—859 |
| 3,297,745 | 1/1967 | Fekete | 260—77.5 |
| 3,304,273 | 2/1967 | Stamberger | 260—859 |
| 3,368,988 | 2/1968 | Sekmakas | 260—859 |

FOREIGN PATENTS 955,961    4/1964    Great Britain.

SAMUEL H. BLECH, *Primary Examiner.*

P. LIEBERMAN, *Assistant Examiner.*

U.S. Cl. X.R.

260—75, 77.5, 858